United States Patent [19]

Grable

[11] Patent Number: 4,874,197
[45] Date of Patent: Oct. 17, 1989

[54] RETRACTABLE PORCH FOR MOBILE HOMES

[76] Inventor: Robert G. Grable, P.O. Box 1163, Calusa, Calif. 95932

[21] Appl. No.: 262,349

[22] Filed: Oct. 25, 1988

[51] Int. Cl.$^4$ .............................................. B60R 3/02
[52] U.S. Cl. .................................... 296/162; 52/79.6; 52/184; 182/88; 280/166
[58] Field of Search ........................ 296/162; 280/166; 52/79.6, 184; 182/88

[56] References Cited

U.S. PATENT DOCUMENTS

| | | | |
|---|---|---|---|
| 2,760,238 | 8/1956 | Lane | 52/79.6 |
| 2,828,842 | 4/1958 | Plumley et al. | 52/282 |
| 2,883,712 | 4/1959 | Shelamar | 52/63 |
| 3,348,345 | 10/1967 | Byers et al. | 52/79.6 |
| 3,515,406 | 6/1970 | Endsley et al. | 296/162 |
| 3,796,456 | 3/1974 | Bergeson et al. | 296/162 |
| 3,808,757 | 5/1974 | Greenwood | 52/184 |
| 4,145,066 | 3/1979 | Shearin | 280/166 |
| 4,347,638 | 9/1982 | Weaver | 182/88 |
| 4,413,855 | 11/1983 | Flanagan | 296/162 |

Primary Examiner—Robert R. Song
Attorney, Agent, or Firm—Jerry T. Kearns

[57] ABSTRACT

A retractable porch for use on motor homes, travel trailers and mobile homes is mounted for movement between erected and collapsed positions. In a first embodiment, a porch frame supports a porch platform and has side members which terminate in attachment struts. A pair of spaced parallel frame rails are secured to the vehicle frame, beneath a door, on the underside of the vehicle. The frame rails are formed from tubular members dimensioned to receive the porch attachment strut members. A pair of porch side railings are secured along perpendicular edges of the porch frame by hinges for movement between a collapsed horizontal position and an erected vertical position. A pair of vertically extending tubular sockets on a side wall of the vehicle for receive the porch attachment strut members during transportation of the vehicle. In a second embodiment, the parallel frame rails are formed from channel beam members which form a horizontal guide track in which the porch platform is mounted for reciprocal sliding movement between extended and retracted positions. A first stationary porch side railing is secured in a vertical position, extending parallel to a side wall of the vehicle. When in a retracted position, the stationary porch side railing serves as a security gate to prevent unauthorized access through the vehicle door.

1 Claim, 5 Drawing Sheets

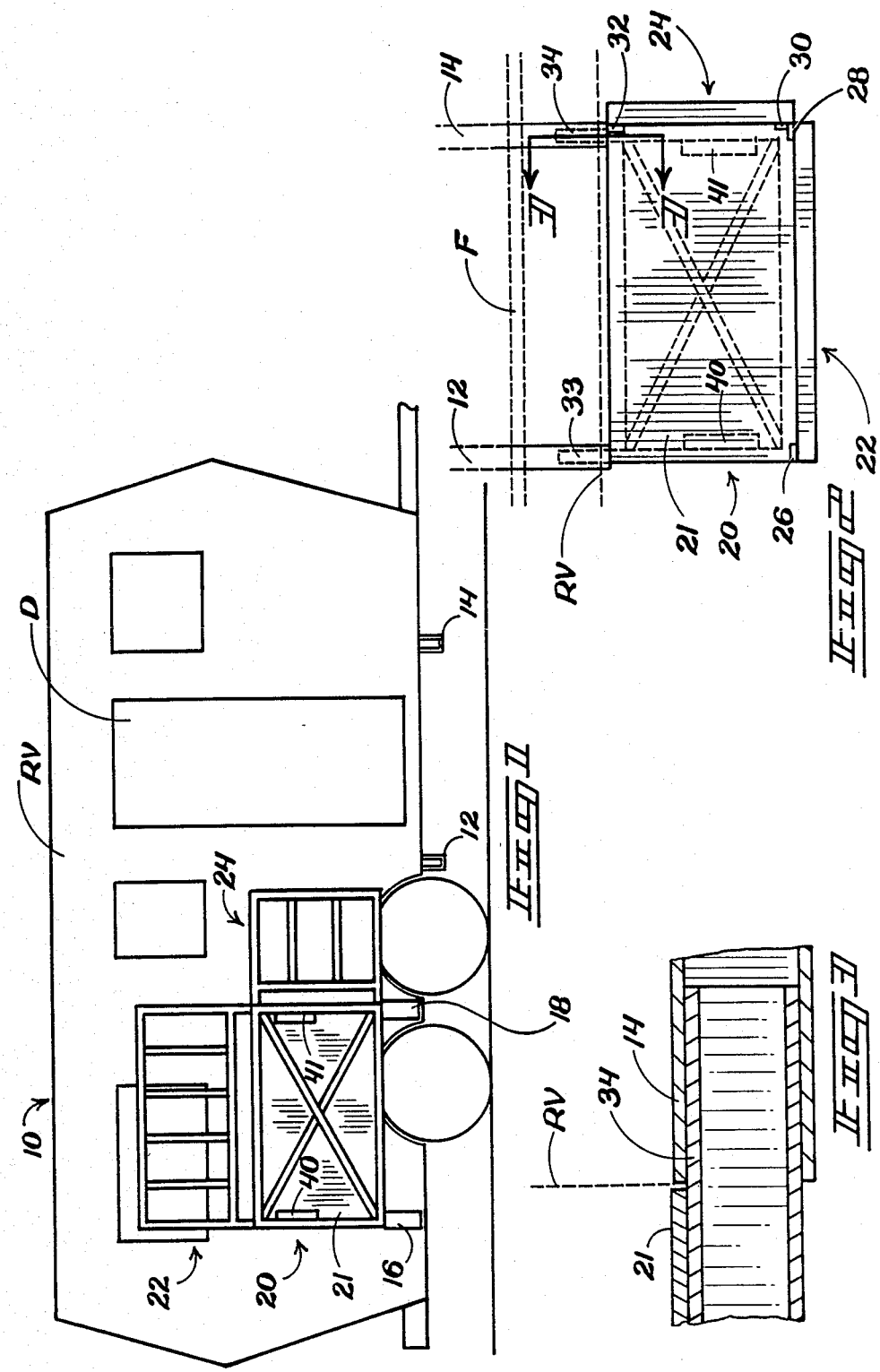

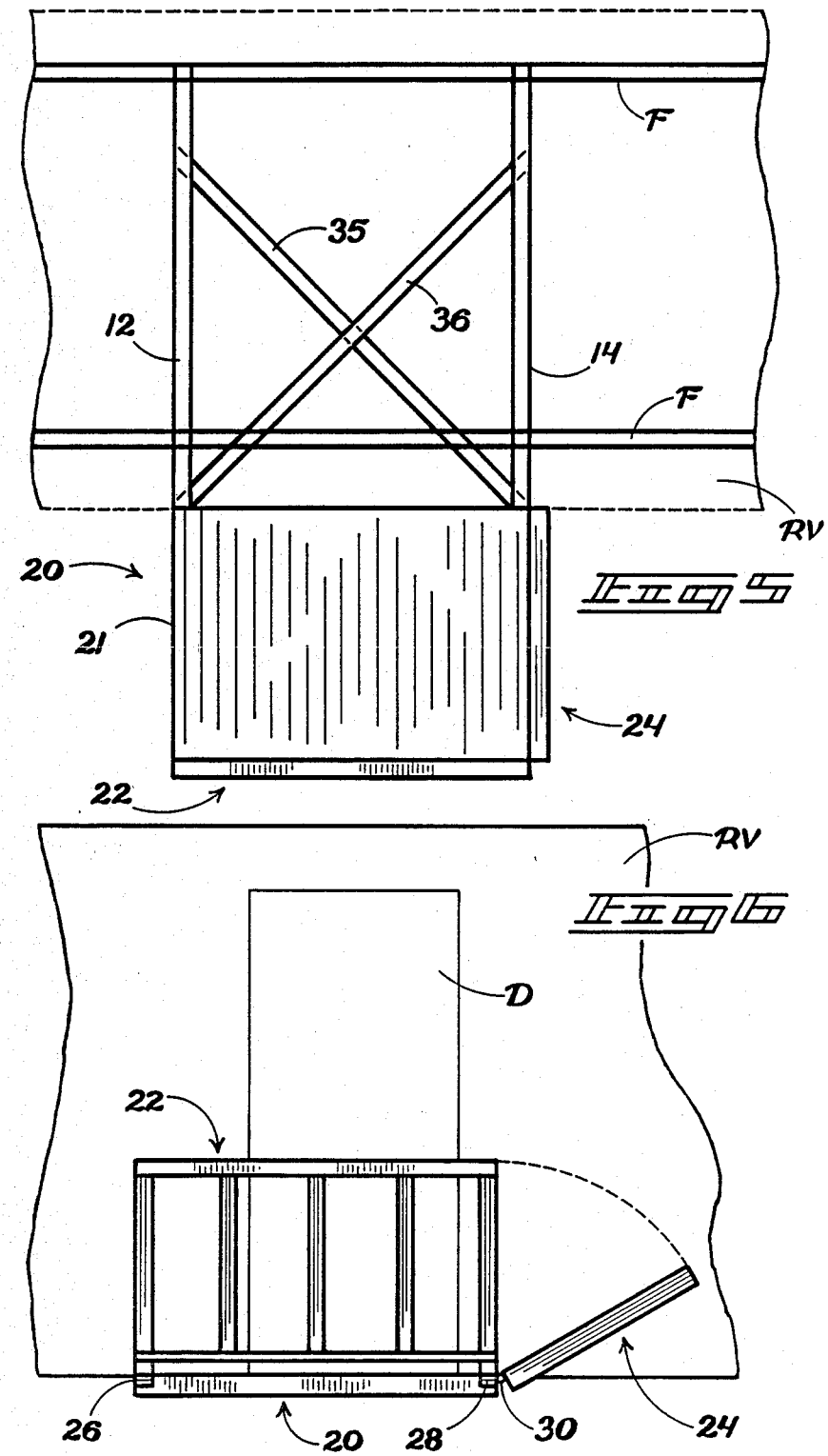

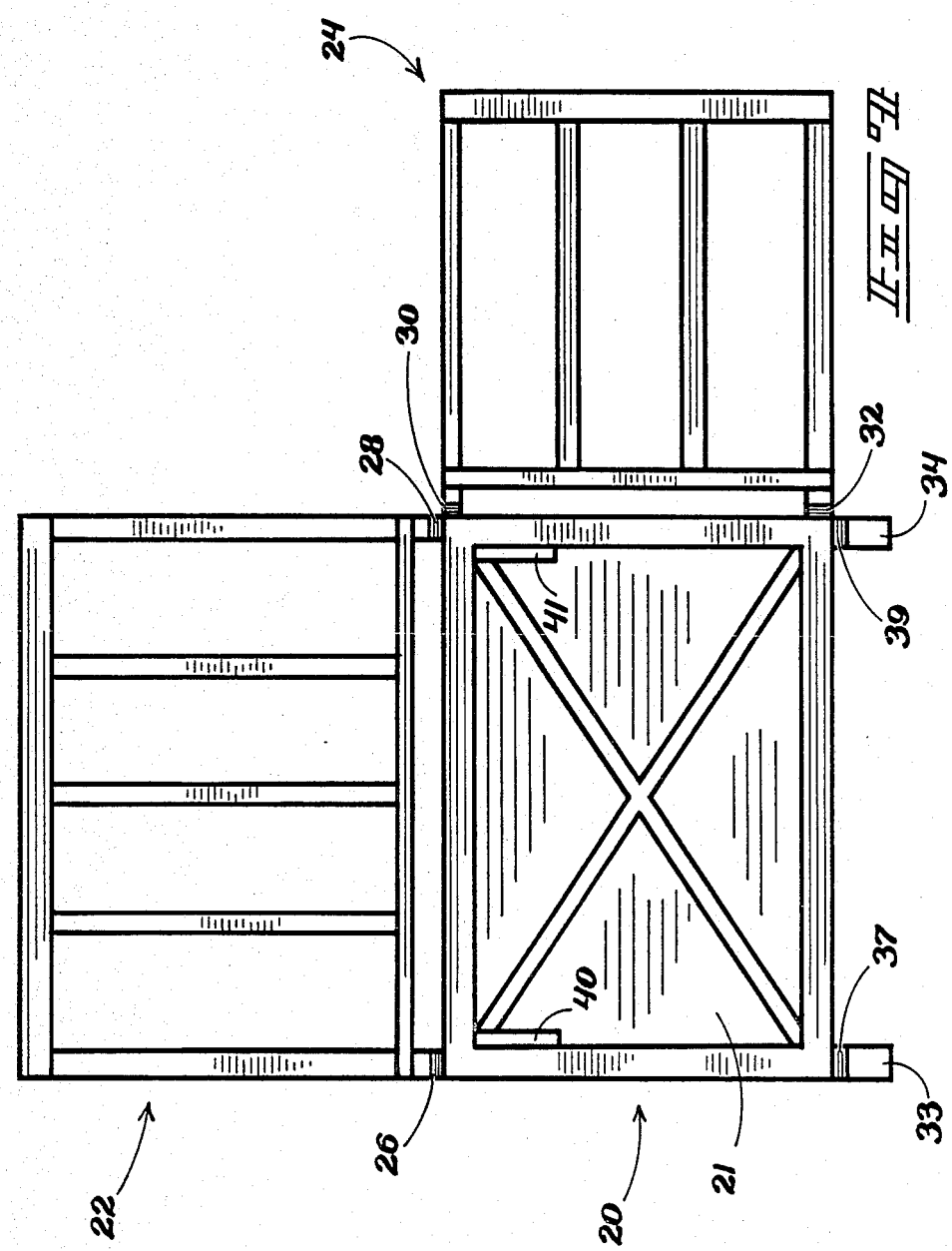

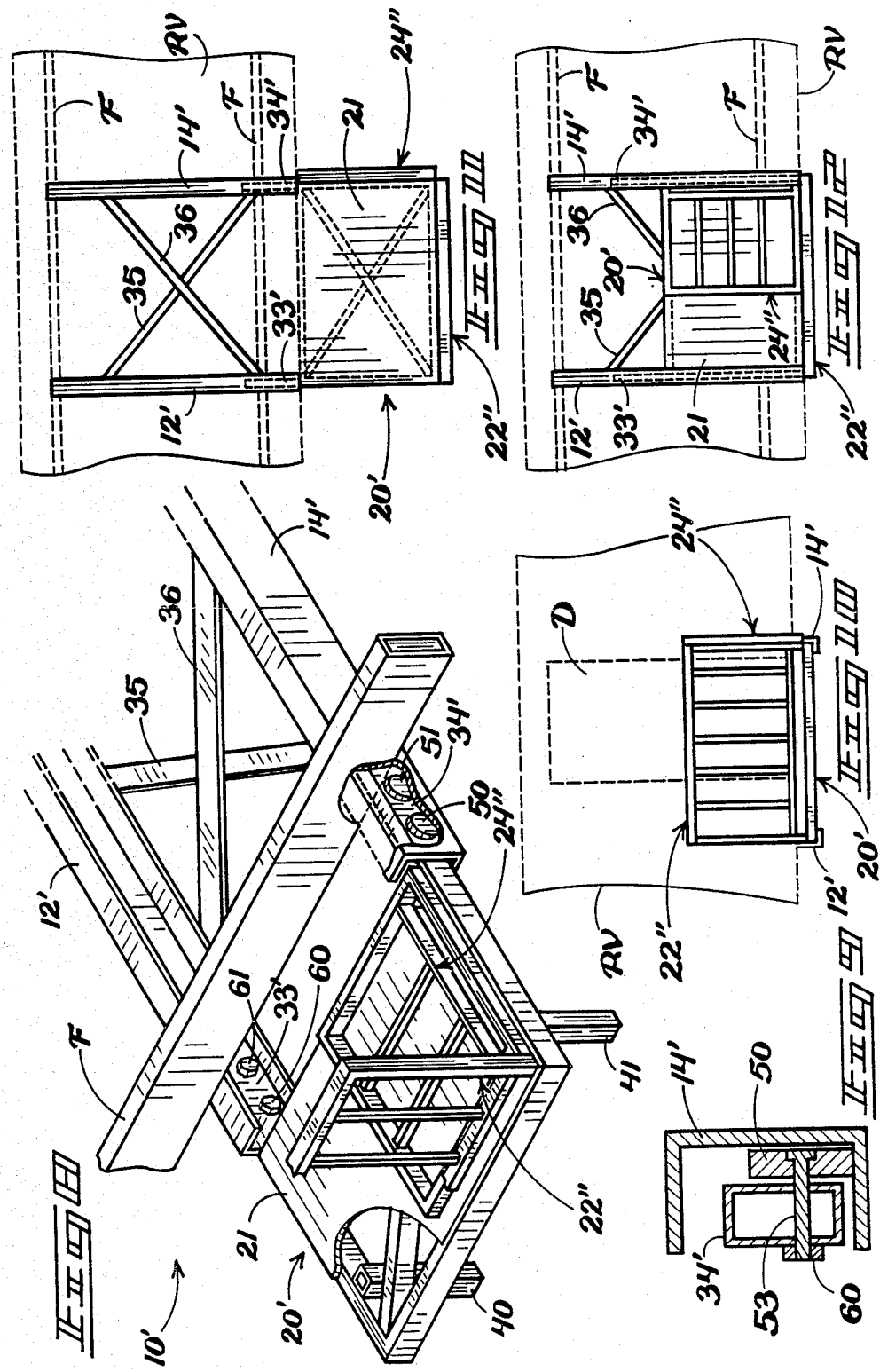

RETRACTABLE PORCH FOR MOBILE HOMES

BACKGROUND OF THE INVENTION

1. Field of the Invention

The present invention relates to porches, and more particularly pertains to a retractable porch for use on motor homes, travel trailers and mobile homes. Recreational vehicles of the types listed above are parked and utilized in a wide variety of different locations. Because the door sill of such vehicles is disposed at a considerable height above the ground, many individuals have difficulty in gaining access through the door of the vehicle. In order to overcome this problem and to provide an easily installed and retractable porch or deck, the present invention provides a collapsible porch which may be easily moved between erected and collapsed conditions for selective use or transportation.

2. Description of the Prior Art

Various types of porches are known in the prior art. A typical example of such a retractable porch for mobile homes is to be found in U.S. Pat. No. 2,760,238, which issued to F. Lane on Aug. 28, 1956. This patent discloses a vestibule construction for use with a trailer having a side door. The vestibule includes a platform having vertically extending legs and a horizontal support surface. The vestibule is designed with a knock down construction. U.S. Pat. No. 2,828,842, which issued to G. Plumley et al on Apr. 1, 1958, discloses a cabana for attachment along a side width wall of a travel trailer. U.S. Pat. No. 2,883,712, which issued to C. Shelamer on Apr. 28, 1959, discloses a knock down trailer porch having screened in side portions and a roof formed by a retractable awning. U.S. Pat. No. 3,348,345, which issued to L. Byers et al on Oct. 24, 1967, discloses a rotatable porch for a mobile home which is secured by frame rail members attached on an underside of the vehicle. U.S. Pat. No. 3,808,757, which issued to G. Greenwood on May 7, 1974, discloses a knock down porch construction which includes a porch frame having vertically extending perpendicular first and second side railings. Adjustably extensible legs are secured on an underside of the porch frame. U.S. Pat. No. 4,413,855, which issued to F. Flanagan on Nov. 8, 1983, discloses a sliding patio for travel trailers and mobile homes. A pair of spaced parallel frame members having facing channels forming a horizontal guide track and are secured to the frame on an underside of the vehicle. A patio is received for sliding movement between extended and retracted positions in the guide track. The patio is provided with collapsible side railings and downwardly extending retractable wheeled support legs.

While the above mentioned devices are suited for their intended usage, none of these devices disclose a removable porch for motor homes, travel trailers and mobile homes which is collapsible and detachable for storage in vertically extending tubular sockets secured on a side wall of a vehicle. Additionally, none of the aforesaid prior art devices disclose the provision of a retractable porch having a stationary fixed side railing which serve as a security gate to prevent unauthorized access through a vehicle door when in a retracted position. Inasmuch as the art is relatively crowded with respect to these various types of porches, it can be appreciated that there is a continuing need for and interest in improvements to such porches, and in this respect, the present invention addresses this need and interest.

SUMMARY OF THE INVENTION

In view of the foregoing disadvantages inherent in the known types of porches now present in the prior art, the present invention provides an improved retractable porch for mobile homes. As such, the general purpose of the present invention, which will be described subsequently in greater detail, is to provide a new and improved retractable porch for mobile homes which has all the advantages of the prior art porches and none of the disadvantages.

To attain this, representative embodiments of the concepts of the present invention are illustrated in the drawings and make use of a retractable porch for use on motor homes, travel trailers and mobile homes mounted for movement between erected and collapsed positions. In a first embodiment, a porch frame supports a porch platform. The porch frame has side members which terminate in attachment struts. A pair of spaced parallel frame rails are secured to the vehicle frame, beneath a door, on the underside of the vehicle. The frame rails are formed from hollow tubular members dimensioned to receive the porch attachment strut members. A pair of porch side railings are secured along perpendicular edges of the porch frame and are mounted by hinges for movement between a collapse horizontal position and an erected vertical position. A pair of vertically extending tubular sockets may be provided on a side wall of the vehicle for receiving the porch attachment strut members during transportation of the vehicle. In a second embodiment of the present invention, the parallel frame rails are formed from channel beam members which form a horizontal guide track in which the porch platform is mounted for reciprocal sliding movement between extended and retracted positions. A first stationary porch side railing is secured in a vertical position, extending parallel to a side wall of the vehicle. A second porch side railing is mounted for movement between a vertical erected position and a horizontal collapsed position. When in a retracted position, the stationary porch side railing serves as a security gate to prevent unauthorized access through the vehicle door.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved retractable porch for mobile homes which has all the advantages of the prior art porches and none of the disadvantages.

It is another object of the present invention to provide a new and improved retractable porch for mobile homes which may be easily and efficiently manufactured and marketed.

It is a further object of the present invention to provide a new and improved retractable porch for mobile homes which is of a durable and reliable construction.

An even further object of the present invention is to provide a new and improved retractable porch for mobile homes which is susceptible of a low cost of manufacture with regard to both materials and labor, and which accordingly is then susceptible of low prices of sale to the consuming public, thereby making such porches economically available to the buying public.

Still yet another object of the present invention is to provide a new and improved retractable porch for mobile homes which provides in the apparatuses and methods of the prior art some of the advantages thereof, while simultaneously overcoming some of the disadvantages normally associated therewith.

Still another object of the present invention is to provide a new and improved retractable porch for mobile homes, motor homes and travel trailers which may easily be retrofitted to existing vehicles.

Yet another object of the present invention is to provide a new and improved retractable porch for mobile homes, motor homes and travel trailers which may easily be transported in a collapsed condition when not in use.

Even still another object of the present invention is to provide a new and improved retractable porch for mobile homes, motor homes and travel trailers which is mounted in a guide track on a frame of the vehicle beneath a side door and is provided with a stationary porch side railing for use as a security gate to prevent unauthorized access through the vehicle door, when in a retracted position.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a travel trailer illustrating the retractable porch according to a first embodiment of the present invention, stored in a transportation position.

FIG. 2 is a diagrammatic top view, illustrating the attachment of the retractable porch according to the first embodiment of the present invention.

FIG. 3 is a cross sectional view, taken along lines 3—3 of FIG. 2.

FIG. 5 is a top view, illustrating the collapsible porch according to the first embodiment of the present invention, in an installed position.

FIG. 6 is a front view, illustrating the manner of erecting the collapsible porch according to the first embodiment of the present invention.

FIG. 7 is a bottom view, illustrating a slightly modified form of retractable porch according to the first embodiment of the present invention.

FIG. 8 is a perspective illustration of a retractable porch according to a second embodiment of the present invention.

FIG. 9 is a cross sectional detail view, illustrating the guide track for the retractable porch of the second embodiment of the present invention.

FIG. 10 is a side view illustrating the retractable porch of the second embodiment of the present invention in an erected condition.

FIG. 11 is a top view, illustrating the retractable porch of the second embodiment of the present invention in an erection condition.

FIG. 12 is a top view illustrating the retractable porch of the second embodiment of the present invention in a retracted condition.

DESCRIPTION OF THE PREFERRED EMBODIMENT

Figure 4:
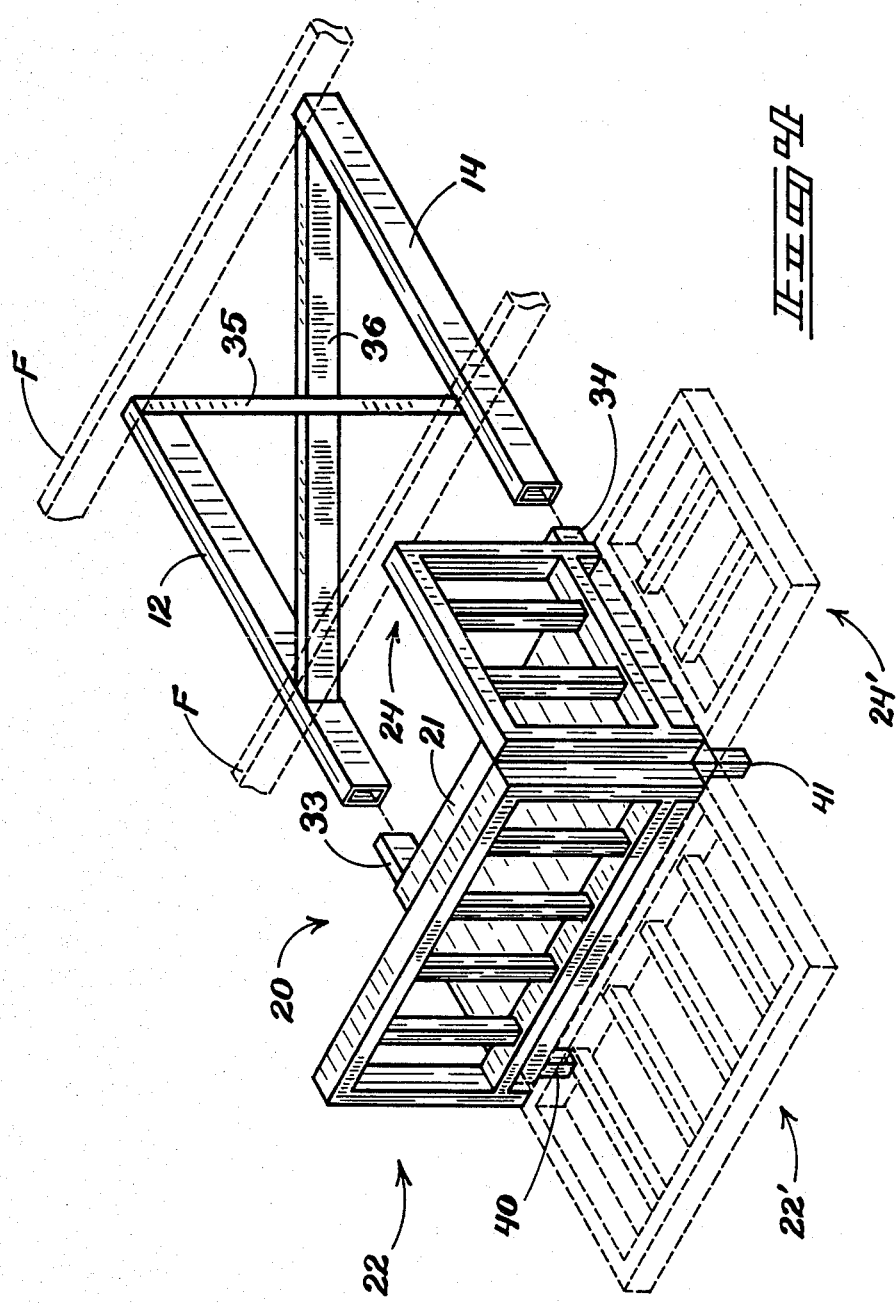
FIG. 4 is a perspective illustration depicting the collapsible porch according to the first embodiment of the present invention.

With reference now to the drawings, and in particular to FIG. 1 thereof, a new and improved retractable porch for mobile homes embodying the principles and concepts of the present invention and generally designated by the reference numeral 10 will be described.

More specifically, it will be noted that the first embodiment 10 of the invention includes a pair of spaced parallel frame rails 12 and 14 secured beneath a door D in a side wall of a recreational vehicle such as a travel trailer RV. The frame rails 12 and 14 are formed from hollow tubular members and are secured to the frame members on the underside of the vehicle RV. The frame rails 12 and 14 may be secured by any conventional means such as bolts, clamps or by welding. A pair of vertically extending tubular sockets are secured on a side wall of the vehicle for securing the retractable porch in the illustrated collapsed position when not in use, for example when the travel trailer is being transported from one location to another. The collapsible porch 10 of the first embodiment of the invention includes a generally rectangular porch frame assembly 20 which supports a rectangular porch platform 21. A first 22 and a second 24 perpendicularly extending porch side railings are secured to the porch frame assembly 20 on perpendicular side edges thereof. The porch side railings 22 and 24 are secured by hinges for movement between the illustrated collapsed position and an erected position. Retractable legs 40 and 41 are attached on the underside of the porch frame assembly 20, for movement between the illustrated retracted position and an extended position in which they extend perpendicularly downwardly with respect to the platform 21. Conventional hinges and locking detents may be utilized to mount the legs 40 and 41 to the porch frame 20.

As shown in the top diagrammatic illustration of FIG. 2, the frame rails 12 and 14 are secured to the frame F to the vehicle RV. A pair of parallel attachment strut members 33 and 34 are dimensioned for insertion into the hollow tubular frame rails 12 and 14 are secured to the porch frame 20. The porch side railings 22 and 24 are secured by hinges 26, 28, 30 and 32 to the porch frame assembly 20. These hinges may be of any conventional construction and a suitable detent mechanism is provided for locking railings 22 and 24 in the illustrated erected vertical position. Any conventional form of detent mechanism, such as locking pins or bolts may be utilized. For example, the mechanism disclosed in U.S. Pat. No. 4,413,855, the disclosure of which is hereby incorporated by reference, may be employed. When the collapsible porch is in the erected position, it provides a small deck or porch adjacent the door D (FIG. 1) of the vehicle RV. When it is desired to move the vehicle, the porch is removed from engagement with the frame rails 12 and 14 and the attachment strut members 33 and 34 are inserted into the sockets 16 and 18 (FIG. 1) of the vehicle. The side railings 22 and 24 are folded down to their collapsed position, in which they extend in a plain generally parallel with the porch platform 21.

FIG. 3 shows a cross sectional detail view illustrating the insertion of the attachment strut member 34 in the hollow tubular frame rail 14 secured to the frame of the vehicle RV.

FIG. 4 provides a perspective illustration of the assembly of the various components. The frame rails 12 and 14 are secured on the frame members F of the vehicle. The porch side railings 22 and 24 are movable between the illustrated erected position and the collapsed position illustrated in phantom line and designated by 22' and 24'. The frame rails 12 and 14 are provided with a pair of centrally intersecting diagonal brace struts 35 and 36, which may be secured by conventional means such as by welding or through the use of threaded fasteners.

FIG. 5 provides a top view illustrating the collapsible porch in an erected condition on the vehicle RV. It should be noted that the frame rails 12 and 14 are permanently secured to the frame members F of the vehicle, and remain in place when the porch frame assembly 20 is removed for transport.

FIG. 6 illustrates the porch side railing 24 in a partially collapsed position.

FIG. 7 provides a back side view of the porch in a collapsed condition. As a slight modification, it is contemplated that attachment strut members 33 and 34 may be attached to the porch frame assembly 20 by hinges 37 and 39. This allows the attachment strut members to remain inserted within the frame rails 12 and 14, while allowing the porch frame 20, and side rails 22 and 24 to be folded into a common plane and against the side wall of the vehicle. Suitable locking pins or bolts may be utilized to secure the attachment strut members 33 and 34 securely in the frame rail members 12 and 14. Any conventional fasteners may be utilized, without departing from the scope of the present invention.

FIG. 8 discloses a retractable porch 10' according to a second embodiment of the invention. The porch 10' includes a generally rectangular porch frame 20' including a platform 21, retractable legs 40 and 41 and a collapsible porch side railing 24" secured by conventional hinges to the porch frame assembly 20'. The porch side railing 22" is fixedly secured in the illustrated upright position to the porch frame assembly 20'. The parallel frame rail members 12' and 14' are formed from channel beam members having facing channels forming a horizontal guide track. The attachment strut members 33' and 34' are each provided with roller bearings 50 and 51, secured by bolts 60 and 61, for reciprocal sliding movement in the horizontal guide track. The entire porch frame assembly 20' including the platform 21 and collapsed side railing 24" is dimensioned for receipt within the guide track formed between the rails 12' and 14'. It should be pointed out that legs 40 and 41 are foldable by a conventional hinge mounting to a retracted position in which they extend parallel with the platform 21.

FIG. 9 provides a cross sectional detail view, which illustrates the attachment strut member 34' received within the channel rail 14'. The roller bearing 50 is mounted for rotation on an axle 53 which extends transversely through an aperture in the attachment strut 34' and is secured by a bolt 60.

FIG. 10 provides a diagrammatic side view, which illustrates the retractable porch in an erected condition adjacent the door D on the side wall of the vehicle RV.

FIG. 11 provides a top diagrammatic illustration which illustrates the porch in an extended position.

FIG. 12 provides a top diagrammatic illustration which illustrates the porch in a retracted position. It should be noted that the entire porch frame assembly 20', platform 21 and collapsed side railing 24" are stored in the guide track formed between the side frame rail members 12' and 14'. Of course, the porch is stored on the underside of the vehicle RV. The fixed, stationary porch side railing 22" extends in a vertical plane, parallel with the side wall of the vehicle, forming a security gate which prevents unauthorized access to the door in the side wall of the vehicle. It should be noted that the porch frame assembly 20' may be secured in the illustrated retracted position through the use of suitable locking detent or pin mechanisms, which may include the use of padlocks to prevent unauthorized extension of the porch.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable porch for mobile homes, comprising:
a pair of spaced parallel frame rails for securement to a frame, below a door, on an underside of a mobile home;
said frame rails formed from channel beam members having facing channels forming a guide track;
a pair of centrally intersecting diagonal brace struts extending between said frame rails;
a generally rectangular porch platform supported on a porch frame;
said porch frame having parallel side members terminating in attachment strut members dimensioned for insertion into said frame rail channels;
said attachment strut member each having roller bearings for guiding said porch platform for reciprocal sliding movement in said guide track for movement between extended and retracted positions;
a first vertically extending stationary side porch railing extending perpendicular to said porch side members;
a second side porch railing mounted by hinges on said porch frame for movement between collapse horizontal and vertical extended positions;
retractable legs on an underside of said porch platform; and
said first side porch railing disposed adjacent said mobile home door and said second side porch railing disposed beneath said mobile home when said porch platform is in a retracted position in said guide track.

* * * * *